INVENTOR
CLIFTON A. BYERS

BY
Oldham & Oldham
ATTORNEYS

United States Patent Office 3,734,797
Patented May 22, 1973

3,734,797
CARBON DISK QUALITY PROCESSING
Clifton A. Byers, Cuyahoga Falls, Ohio, assignor to The Goodyear Tire & Rubber Company, Akron, Ohio
Filed June 29, 1971, Ser. No. 157,822
Int. Cl. B32b 31/00
U.S. Cl. 156—253
5 Claims

ABSTRACT OF THE DISCLOSURE

Brake disk blanks are formed by laying up layers of resin impregnated graphite or carbon cloth. Small diameter holes are provided through the layer at spaced intervals over the entire surface of the blank after the blanks are partially cured. The blanks are subsequently fully cured in baking cycles at a temperature sufficient to carbonize and/or graphitize the resin, with a pressure of not less than 500 p.s.i. being applied to the blanks during the bake cycles. The invention contemplates that the invention can be performed with or without pressure, however.

---

Among the problems encountered with brake disk blanks formed of laminated graphite or carbon cloth have been the delamination of the cloth layers and the occurrence of localized low density areas in the disk blank. Heretofore no adequate solution to these difficulties has been achieved.

The present invention, however, does provide a solution to the problems of delamination and low density areas in laminated brake disk blanks. It has been discovered that these problems are attributable to the generation and entrapment of gases during the curing process.

It is the primary object of the present invention to provide a method for forming laminated carbon or graphite brake disk blanks in which the problems of delamination and localized low density areas are eliminated.

It is also an object of the invention to provide a process for forming laminated carbon or graphite brake disk blanks in which escape paths are provided for any gas generated during the curing process.

A further object of the invention is the provision of a process for forming brake disk blanks which produces a blank of uniform density throughout, free from delaminations.

According to the teachings of the invention, the above and other objects which will become apparent in the following detailed description of the invention are achieved by providing a process for forming laminated carbon or graphite brake disk blanks in which small diameter uniformly spaced holes are provided in the blank prior to the final high temperature curing processes. The holes provide for the venting of any gases entrapped between the laminations of the blank. The process of the present invention also contemplates that the disk blanks will be cured under high temperature with or without pressure to insure the expulsion of any gas from between the laminations and to produce a blank of more uniform density.

For a more complete understanding of the invention and of the objects and advantages thereof reference should be had to the following detailed description and the accompanying drawing wherein there is shown a preferred embodiment of the invention.

Figure 3:
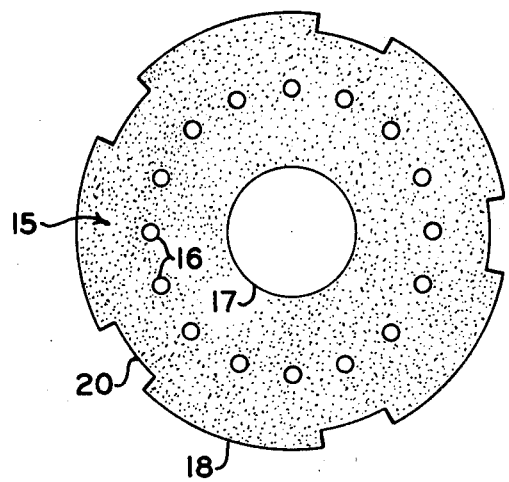
FIG. 3 is a plan view of a finished brake disc.

The brake disk blank 10 is formed of a number of layers 12. Each of the layers 12 is a carbon or graphite cloth which has been impregnated with resin. It should be noted that the number of layers shown is illustrative only. The desired thickness and structural properties of the brake disk determine the actual number of layers of graphite or carbon cloth 12 used. The blank 10 may be provided with a central hole 14 which forms the central hole of the brake disk. While the blank 10 is shown as having a square configuration it will be understood that the blank is cut or machined to the desired annular configuration after the curing process as shown in FIG. 3.

When the desired number of resin impregnated cloth layers 12 have been laid up to form the blank 10 the blank is subjected to a curing process consisting of a series of baking cycles at temperatures sufficient to cause the resin to carbonize, or graphitize, i.e. change to carbon or graphite and discharge gas. The entrapment of gas between cloth layers 12 during the curing process may cause delamination of these layers. Moisture may also be present in the resin or cloth layers and produce vapor during the curing process and also cause delamination of the cloth layers 12. The entrapped gas or moisture may also result in voids within the blank 10, producing localized low density areas. In order to provide for the escape of any entrapped moisture of gas, venting holes are drilled into the blank 10.

Figure 1:
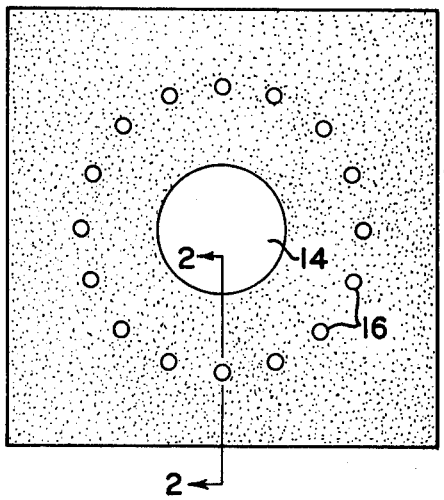
FIG. 1 is a plan view of a brake disk blank formed in accordance with the teachings of the present invention.
Figure 1A:
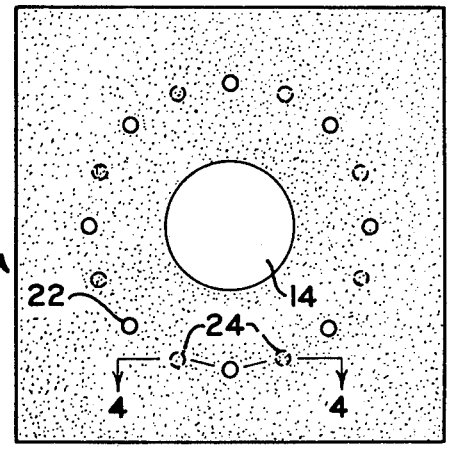
FIG. 1A is a plan view of a brake disc blank formed in accordance with the teachings of the present invention.
Figure 4:
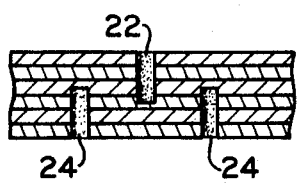
FIG. 4 is a fragmentary sectional view, on an enlarged scale, taken along the line 4—4 of FIG. 1A.

The venting holes are drilled after a partial cure of the blank 10, i.e. the blank is laid up from several layers of resin impregnated cloth, it is subjected to a cure under pressure at a temperature sufficient to solidify the resin, the venting holes are then drilled into the solid laminate blank and then the blank is given a final cure with or without pressure and at temperatures sufficient to carbonize or graphitize the resin as described above. In a typical disk blank the venting holes may be of ⅛ inch diameter and located in a circular row about equidistant from the inner and outer circumferential edges 17 and 18 of a finished brake disc as shown in FIG. 3. If the venting holes are extended through all layers of the blank, such as holes 16 shown in FIG. 1, a single row of holes would be used as seen in FIGS. 1 and 3. If venting holes were extended only part way through the blank, such as holes 22 and 24 shown in FIG. 4, a row of holes could be alternately spaced on opposite sides of the blank as seen in FIGS. 1A and 4. The venting holes may be located approximately 2 inches apart, or at intervals no less than every four square inches but the exact location of each hole is determined so as not to interfere with the structural integrity of the finished brake disc 15 as shown in FIG. 3. Thus the venting holes are placed in positions such that they are not in close proximity to key slots 20, or to inner edge 17 or outer edge 18 of the finished brake disc 15.

Figure 2:
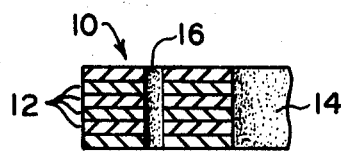
FIG. 2 is a fragmentary sectional view, on an enlarged scale, taken along the line 2—2 of FIG. 1.

As can be seen from FIG. 2, the holes 16 extend through the blank and thus provide venting of any gases between each of the layers.

As can be seen from FIG. 4, venting holes 22 and 24 may be used which extend through several layers 12, but which do not extend entirely through the blank 10. These holes 22 and 24 would extend more than half way but less than three-fourths of the way into the blank. Use of holes 22 and 24 would also provide venting of any gases between each of the layers 12 and more holes could be used by alternate spacing on opposite sides of the blank as shown in FIG. 1A, without interfering with the structural integrity of the finished disc 15 as shown in FIG. 3.

While the holes 16 are indicated as being substantially perpendicular to the surface of the disc in FIGS. 21A, it should be understood that they may be at various angles and of different size in relation to their position in the final disc configuration, as long as they don't interfere with the structural integrity of the disc.

In order to assure the complete expulsion of all trapped gases and to assure a complete and uniform bonding of the laminations 12 throughout the entire disk blank 10, during the carbonization under heating the present invention also contemplates that the blank 10 could be subjected to uniform pressure during the baking cycles. A pressure of 500 p.s.i., applied uniformly to the blank 10, has been found to be adequate to achieve the desired expulsion of entrapped gases and to effect the complete and uniform bonding of the graphite or carbon cloth layers 12.

The invention contemplates that the process may be carried out with or without the presence of pressure in the final cure steps, although it appears to be preferable to utilize pressure to insure the best lamination. The invention further contemplates that for certain small elements, the use of pressure alone, without any small holes, to complete the final cure under temperature will satisfactorily accomplish the objects of the invention.

While only the best known embodiment of the invention has been illustrated and described in detail, in accordance with the patent statutes, it will be understood that the invention is not so limited and that modifications may be made. Reference should therefore be had to the appended claims in determining the true scope of the invention.

What is claimed is:

1. A process for forming a brake disc blank which comprises the steps of
    forming a plurality of layers of resin impregnated carbon material cloth;
    partially curing the plurality of layers of the resin impregnated cloth;
    providing a plurality of spaced, small diameter holes in the plurality of layers following the partial cure;
    providing an inwardly directed pressure against the outside surface of the blank; and
    completely curing the plurality layers at a temperature sufficient to carbonize the resin.

2. A process according to claim 1 wherein the holes are of one-eighth inch diameter and are spaced in a circular row with said holes approximately two inches apart, said spacing being done in such a manner as not to interfere with the structural integrity of the finished brake disc.

3. A process according to claim 1 which includes positioning the holes at no less than every four square inches of disc surface.

4. A process according to claim 1 which includes terminating the holes before they extend entirely through all layers, and providing approximately an equal number of holes on each side of the disc.

5. A process according to claim 3 which includes forming the layers of cloth to an annular disc configuration, and positioning the holes in a circular pattern around the disc equidistant from the inner and outer circumferences thereof.

References Cited
UNITED STATES PATENTS

| | | | |
|---|---|---|---|
| 3,203,849 | 8/1965 | Katz et al. | 161—96 |
| 2,427,700 | 9/1947 | Atkinson et al. | 174—106 |
| 473,841 | 4/1892 | Hulin | 161—96 |
| 3,388,796 | 6/1968 | Roberts | 156—253 X |

NORMAN G. TORCHIN, Primary Examiner

J. L. GOODROW, Assistant Examiner

U.S. Cl. X.R.

161—88